US010161577B2

(12) United States Patent
Casper et al.

(10) Patent No.: US 10,161,577 B2

(45) Date of Patent: Dec. 25, 2018

(54) ELECTRICAL CONNECTION OF CONTROL CIRCUIT CARD TO POWER SUPPLY IN LED LUMINAIRE ASSEMBLY

(71) Applicant: Eaton Intelligent Power Limited, Dublin (IE)

(72) Inventors: Joseph R. Casper, Syracuse, NY (US); Christopher D. Nolan, Syracuse, NY (US); Joseph J. Witkowski, Syracuse, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/388,735

(22) Filed: Dec. 22, 2016

(65) Prior Publication Data

US 2017/0184261 A1 Jun. 29, 2017

Related U.S. Application Data

(60) Provisional application No. 62/271,497, filed on Dec. 28, 2015.

(51) Int. Cl.

*B01D 46/00* (2006.01)
*H05B 37/02* (2006.01)

(Continued)

(52) U.S. Cl.

CPC .............. *F21S 2/005* (2013.01); *F21V 15/01* (2013.01); *F21V 21/30* (2013.01); *F21V 23/005* (2013.01); *F21V 23/02* (2013.01); *F21V 23/06* (2013.01); *F21V 29/74* (2015.01); *H01R 12/714* (2013.01); *H01R 13/24* (2013.01); *F21Y 2115/10* (2016.08); *H01R 12/7076* (2013.01); *H05B 33/0845* (2013.01); *H05B 33/0857* (2013.01); *H05B 37/0272* (2013.01)

(58) Field of Classification Search

CPC .......... F21S 2/005; F21V 29/74; F21V 15/01; F21V 21/30; F21V 23/005; F21V 23/02; F21V 23/06; H01R 12/714; H01R 13/24; H01R 12/7076; F21Y 2115/10; H05B 33/0845; H05B 33/0857; H05B 37/0272

USPC .......................................... 315/246–287; 1/1

See application file for complete search history.

(56) References Cited

U.S. PATENT DOCUMENTS

2012/0033419 A1* 2/2012 Kim ........................ F21S 8/026 362/235

2013/0077307 A1* 3/2013 Yamamoto ............. F21S 8/026 362/244

(Continued)

*Primary Examiner* — Brandon S Cole

(74) *Attorney, Agent, or Firm* — Fox Rothschild LLP

(57) ABSTRACT

A light emitting diode (LED) luminaire device includes an LED housing with one or more LED modules. The device also includes a control circuit that is electrically connected to each of the LED arrays. The device includes a body with a power supply, and a contact surface that is electrically connected to the power supply. The body is separable from the LED at the contact surface. Electrical contacts are electrically connected to one of either the control circuit or the contact surface; and a landing pads are electrically connected to the other of either the control circuit or the contact surface. The contacts and landing pads are positioned to align to each other and provide one or more conductive paths between the power supply and the control circuit when the LED housing is connected to the body.

25 Claims, 9 Drawing Sheets

(51) Int. Cl.

| | |
|---|---|
| ***G08B 1/08*** | (2006.01) |
| ***G06K 9/00*** | (2006.01) |
| ***H05B 33/08*** | (2006.01) |
| ***F21S 2/00*** | (2016.01) |
| ***H01R 13/24*** | (2006.01) |
| ***F21V 29/74*** | (2015.01) |
| ***F21V 23/02*** | (2006.01) |
| ***F21V 23/06*** | (2006.01) |
| ***F21V 23/00*** | (2015.01) |
| ***F21V 21/30*** | (2006.01) |
| ***F21V 15/01*** | (2006.01) |
| ***H01R 12/71*** | (2011.01) |
| *F21Y 115/10* | (2016.01) |
| *H01R 12/70* | (2011.01) |

(56) References Cited

U.S. PATENT DOCUMENTS

| | | | | |
|---|---|---|---|---|
| 2014/0334149 | A1 | 11/2014 | Nolan et al. | |
| 2015/0145418 | A1* | 5/2015 | Pope .................. | H05B 33/0854 315/152 |
| 2015/0167937 | A1* | 6/2015 | Casper .................... | F21V 23/02 362/294 |
| 2015/0173147 | A1* | 6/2015 | Casper ................. | G09G 3/3413 315/152 |
| 2016/0073470 | A1* | 3/2016 | Casper ................. | G09G 3/3413 315/153 |
| 2017/0211762 | A1* | 7/2017 | Thomas .................. | F21S 2/005 |

* cited by examiner

ELECTRICAL CONNECTION OF CONTROL CIRCUIT CARD TO POWER SUPPLY IN LED LUMINAIRE ASSEMBLY

RELATED APPLICATIONS AND CLAIM OF PRIORITY

This patent document claims priority to U.S. provisional patent application No. 62/271,497, filed Dec. 28, 2015, the disclosure of which is hereby incorporated by reference in full.

BACKGROUND

Light-emitting diode (LED) array technology is currently used to provide lighting in a wide range of applications in which the user needs high intensity illumination. Typically, the LED array of a LED luminaire assembly is in an LED module with associated electronics. A single LED luminaire assembly can have one or more LED modules.

A drawback of existing LED luminaire assemblies is their "throw-away" design. That is, most existing LED luminaire assemblies are designed primarily to be manufactured rather than repaired or serviced in the field to extend lifespan. Such lack of in-field serviceability leads to disposal of the entire luminaire assembly rather than replacing its electronics or LED. This wastes resources, since many components, such as LED modules, are still serviceable.

Another drawback of existing LED luminaire assemblies is that the LED modules are wired to a power supply using wiring terminals or connectors. Wiring terminals require tools and introduce the element of human error. Connectors prevent the element of human errors but can break or sometimes be difficult to disconnect.

This document describes new illumination devices that are directed to solving the issues described above, and/or other problems.

SUMMARY

In an embodiment, a light emitting diode (LED) luminaire device includes an LED housing with one or more LED modules. The device also includes a control circuit that is electrically connected to each of the LED arrays. The device includes a body with a power supply, and a contact surface that is electrically connected to the power supply. The body is separable from the LED at the contact surface. Electrical contacts are electrically connected to one of either the control circuit or the contact surface. Landing pads are electrically connected to the other of either the control circuit or the contact surface. The contacts and landing pads are positioned to align to each other and provide one or more conductive paths between the power supply and the control circuit when the LED housing is connected to the body.

The LED housing may also include an interface plate, and the control circuit may be connected to the interface plate.

In another embodiment, a light emitting diode (LED) luminaire device, includes an LED housing comprising one or more LED modules, an interface plate, and a control circuit connected to the interface plate. The control circuit is electrically connected to each of the LED modules. The device may include a body comprising a communication circuit, and a contact surface that is electrically connected to the communication circuit. A set of contacts may be electrically connected to one of either the control circuit or the contact surface. A set of landing pads may be electrically connected to the other of either the control circuit or the contact surface. one or more of the contacts and one or more of the landing pads are positioned to align to each other and provide one or more conductive paths between the communication circuit and the control circuit when the LED housing is connected to the body.

In either embodiment, the device may include a power supply included in the body, a first contact electrically connected to the power supply via the contact surface, and a second contact electrically connected to the control circuit. The first contact may be either a spring contact or a landing pad. The second contact may be the other of either a spring contact or a landing pad. The first and second contacts may be positioned to align to each other and provide a conductive path for transmission of power between the power supply and the control circuit when the LED housing is connected to the body.

In either embodiment, body further may include a transformer configured to convert power received at the power supply before transmission to the control circuit, via the conductive path.

In either embodiment, some or all of the contacts may be spring contacts.

Optionally, the device may have a transceiver included in the body, a first contact electrically connected to the transceiver via the contact surface, and a second contact electrically connected to the control circuit. The first contact may be either a spring contact or a landing pad, while the second contact is the other of either a spring contact or a landing pad. The first and second contacts are positioned to align to each other and provide a conductive path for communication signals between the transceiver and the control circuit when the LED housing is connected to the body.

In either embodiment, the body of the device may include fins that form a heat sink. The body also may include a transformer configured to convert power received at the power supply before transmission to the control circuit, via the conductive path.

In either embodiment, the contact surface may have a shape that allows for the attachment of the contact surface to the body in only one configuration.

In either embodiment, the landing pads may each have a surface area that is more than a surface area of corresponding ones of the plurality of spring contacts that form the one or more conductive paths.

In either embodiment, one or more of the contacts may be included in a contact housing.

In either embodiment, the device of claim 10 may include: a power supply configured to be attached to the LED housing; a first contact electrically connected to the power supply; and a second contact electrically connected to the contact surface. The first contact may be either a spring contact or a landing pad, the second contact may be the other of either a spring contact or a landing pad, and the first and second contacts may be positioned to align to each other and provide a first conductive path for transmission of AC power between the power supply and the contact surface when the LED housing is connected to the body. The device also may include a third contact electrically connected to the control circuit, a fourth contact electrically connected to the contact surface, and a transformer configured to convert AC power received, via the first conductive path, to DC power. The third contact may be either a spring contact or a landing pad, the fourth contact may be the other of either a spring contact or a landing pad, and the third and fourth contacts may be positioned to align to each other and provide a second conductive path for transmission of DC power to the control circuit when the LED housing is connected to the body.

In either embodiment, the contact surface may have a shape that allows for the attachment of the contact surface to the body in only one configuration.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

Figure 1:
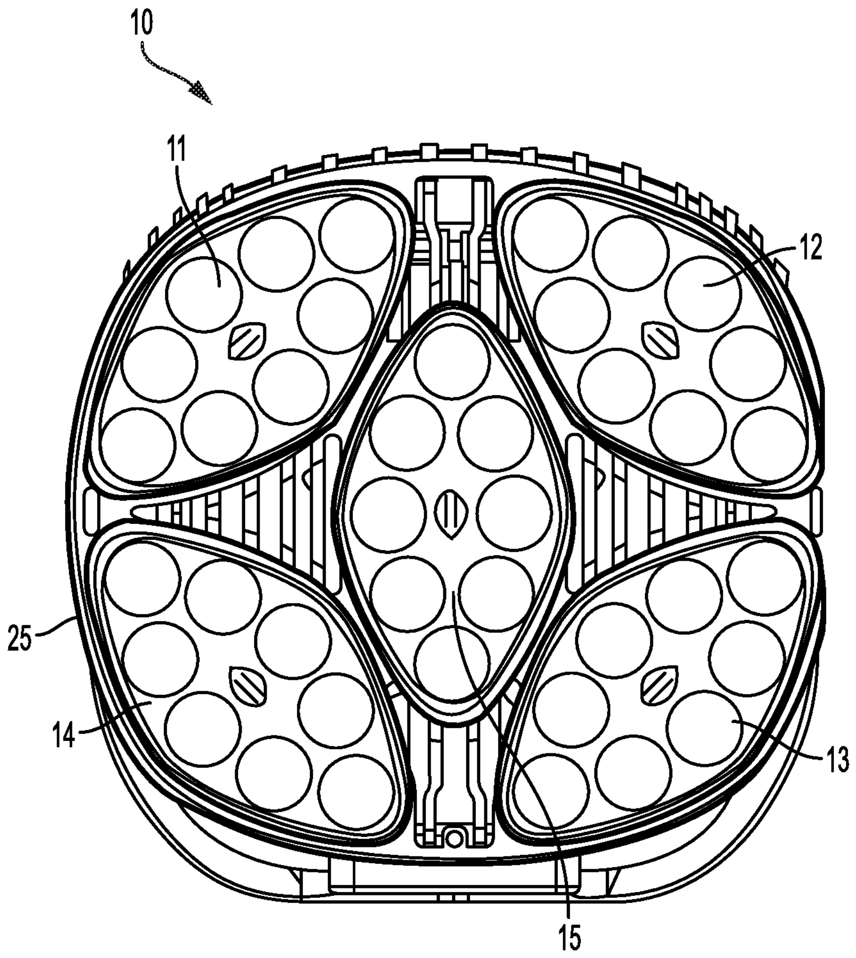
FIG. 1 illustrates a front view of an example of one embodiment of the illumination devices disclosed in this document.
Figure 2:
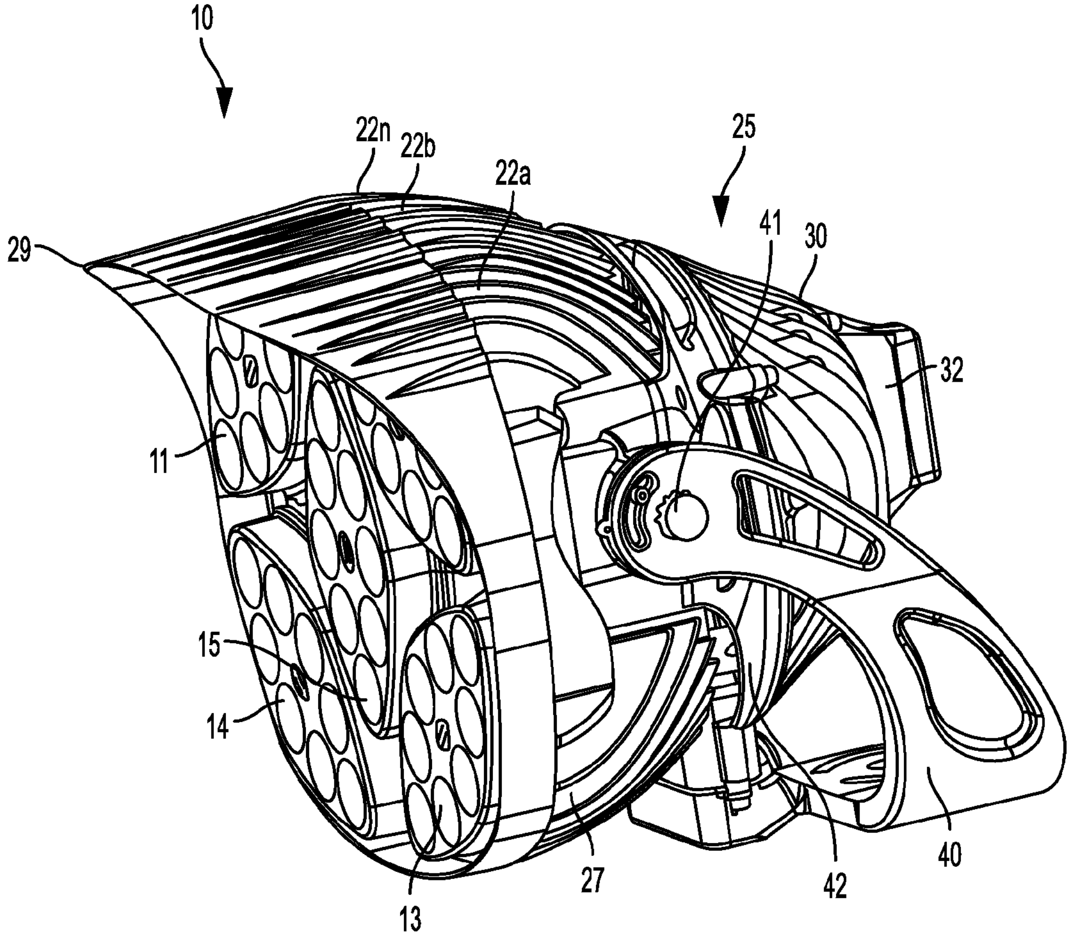
FIG. 2 provides a perspective view of the device of FIG. 1.

FIG. 1 illustrates a front view of an example of one embodiment of the illumination devices disclosed in this document. FIG. 2 provides a perspective view. The illumination device 10 includes a housing 25 that encases various components of a light fixture. As shown in FIG. 1, the housing 25 includes an opening in which a set of light emitting diode (LED) modules 11-15 are secured to form a multi-module LED structure. The LED modules 11-15 are positioned to emit light away from the fixture. Each LED module includes a frame that holds a set of LEDs arranged in an array or other configuration. In various embodiments the number of LEDs in each module may be any number that is sufficient to provide a high intensity LED device. Each LED module will also include a substrate on which the LEDs, various conductors and/or electronic devices, and lenses for the LEDs are mounted.

The opening of the housing 25 may be circular, square, or a square with round corners as shown in FIG. 1, although other shapes are possible. The LED modules 11-15 may include five modules as shown, with four of the modules 11-14 positioned in a quadrant of the opening and the fifth module 15 positioned in the center as shown. Alternatively, any other number of LED modules, such as one, two, three, four or more LED modules, may be positioned within the opening in any configuration.

The device's housing 25 includes a body portion 27 and an optional shroud portion 29. The body portion 27 serves as a heat sink that dissipates heat that is generated by the LED modules. The body/heat sink 27 may be formed of aluminum and/or other metal, plastic or other material, and it may include any number of fins 22*a* . . . 22*n* on the exterior to increase its surface area that will contact a surrounding cooling medium (typically, air). Thus, the body portion 27 or the entire housing 25 may have a bowl shape as shown, the LED modules 11-15 may fit within the opening of the bowl, and heat from the LED modules 11-15 may be drawn away from the LED modules and dissipated via the fins 22*a* . . . 22*n* on the exterior of the bowl.

While the LED modules are positioned at the front of body portion 27, the opposing side of the body portion may be attached to a power supply housing 30, optionally via a thermal interface plate. The power supply housing 30 may include a battery, solar panel, or circuitry to receive power from an external and/or other internal source. A power supply housing 30 may be positioned at the rear of the body (i.e., at the bottom of the bowl), and the interior of the unit may include wiring or other conductive elements to transfer power and/or control signals from the power supply housing 30 to the LED modules 11-15. The power supply housing 30 may be positioned at or near the rear of the body as shown, or it may be placed into another portion of the body so that it is flush or substantially flush with the rear of the body 27, or it may be configured to extend to some point between being flush with the body portion 27 and an extended position. A sensor cavity 32 may be attached to the power supply and/or other part of the device as shown, and it may contain sensors and/or control and communications hardware for sensing parameters of and controlling the device, receiving commands, and transmitting data to remote control devices.

The housing 25 may be formed as a single piece, or it may be formed of two pieces that fit together as in a clamshell-type structure. In a clamshell design, a portion of the interior wall of the clamshell near its opening may include a groove, ridge, or other supporting structure that is configured to receive and secure the LED structure in the opening when the clamshell is closed. In addition, the fins 22*a* . . . 22*n* may be curved or arced as shown, with the base of each fin's curve/arc positioned proximate the opening/LED modules, and the apex of each fin's curve/arc positioned distal from the opening/LED modules to further help draw heat away from the LED modules. The housing may be attached to a support structure 40, such as a base or mounting yoke, optionally by one or more connectors 41. As shown, the connectors 41 may include axles about which the housing and/or support structure may be rotated to enable the light assembly to be positioned to direct light at a desired angle.

The power supply housing 30 may be detachable from remainder of the lighting device's housing 25 so that it can be replaced and/or removed for maintenance without the need to remove the entire device from an installed location, or so that it can be remotely mounted to reduce weight. The power supply unit 30 and/or a portion of the lighting unit housing 25 may include one or more antennae, transceivers or other communication devices that can receive control signals from an external source. For example, the illumination device may include a wireless receiver and an antenna that is configured to receive control signals via a wireless communication protocol. Optionally, a portion of the lighting unit housing 25 or shroud 29 (described below) may be equipped with an attached laser pointer that can be used to identify a distal point in an environment to which the lighting device directs its light. The laser pointer can thus help with installation and alignment of the device to a desired focal point.

FIGS. 1 and 2 show that the device may include a shroud 29 that protects and shields the LED modules 11-15 from falling rain and debris, and that may help direct light toward an intended illumination surface. The shroud 29 may have any suitable width so that an upper portion positioned at the top of the housing is wider than a lower portion positioned at the bottom and/or along the sides of the opening of the housing. This may help to reduce the amount of light wasted to the atmosphere by reflecting and redirecting stray light downward to the intended illumination surface.

The fins 22*a* . . . 22*n* may be positioned substantially vertically (i.e., lengthwise from a top portion of the LED array structure and shroud 29 to a bottom portion of the same). Optionally, one or more lateral supports may be interconnected with the fins to provide support to the housing. The lateral supports may be positioned substantially parallel to the axis of the fins, or they may be curved to extend away from the LED structure, or they may be formed of any suitable shape and placed in any position. Each support may connect two or more of the fins. The fins and optional supports form the body portion 27 as a grate, and hot air may rise through the spaces that exist between the fins and supports of the grate. In addition, precipitation may freely fall through the openings of the grate. In addition, any small debris (such dust or bird droppings) that is caught in the grate may be washed away when precipitation next occurs.

Figure 3:
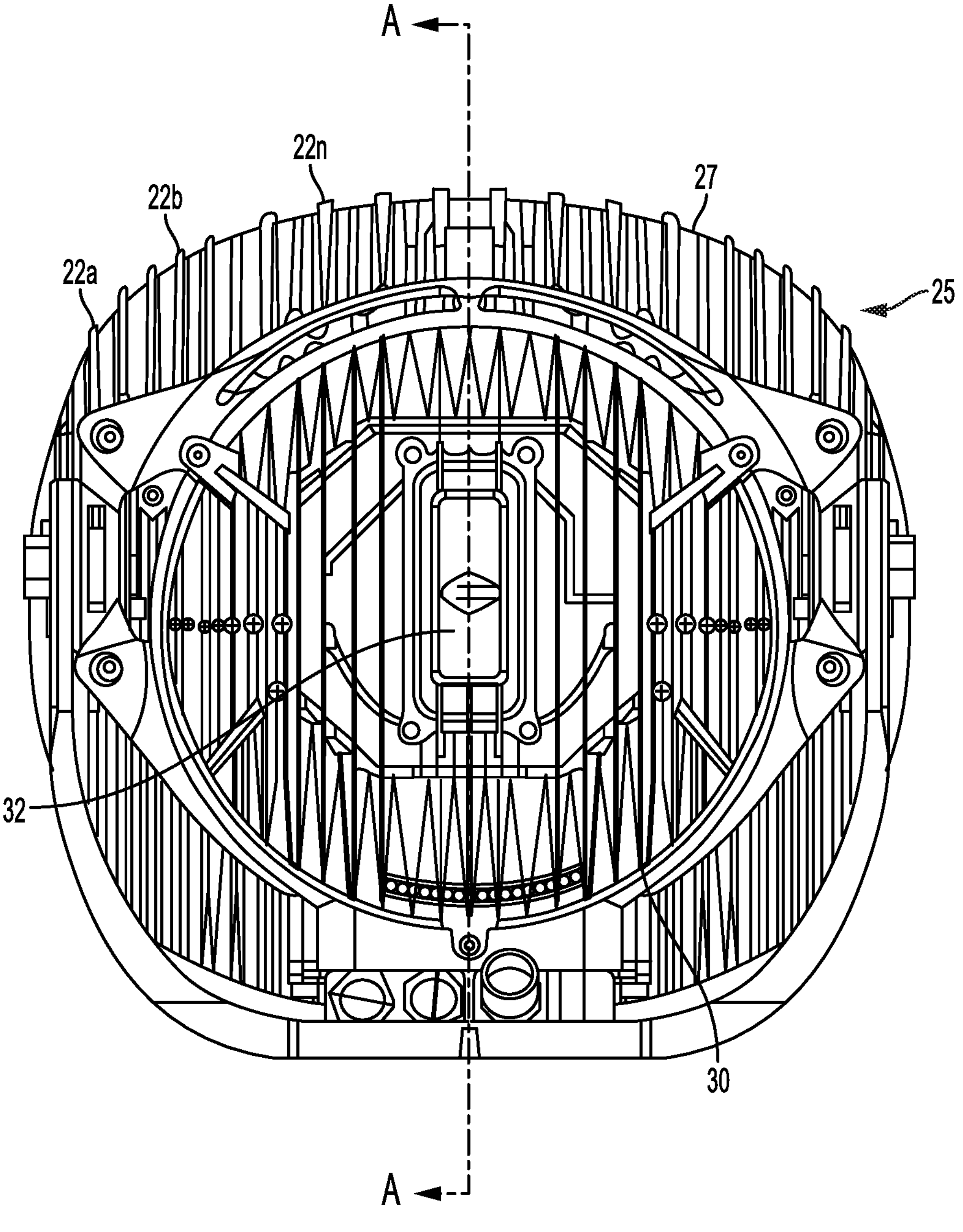
FIG. 3 illustrates an embodiment of the lighting device, viewed from the rear.

FIG. 3 illustrates an embodiment of the lighting device as viewed from the rear. As with the other views, the fins 22*a* . . . 22*n* may be positioned substantially vertically to form a heat sink. The power supply housing 30 and sensor cavity 32 may be connected at the rear of the device as shown. The power supply housing 30 may be connected to the remainder of the body portion 27 by a thermal separation interface 42 that is made of an insulating or heat shielding material to help block heat generated by the power supply from entering the remainder of the body and reaching the LED modules.

Figure 4:
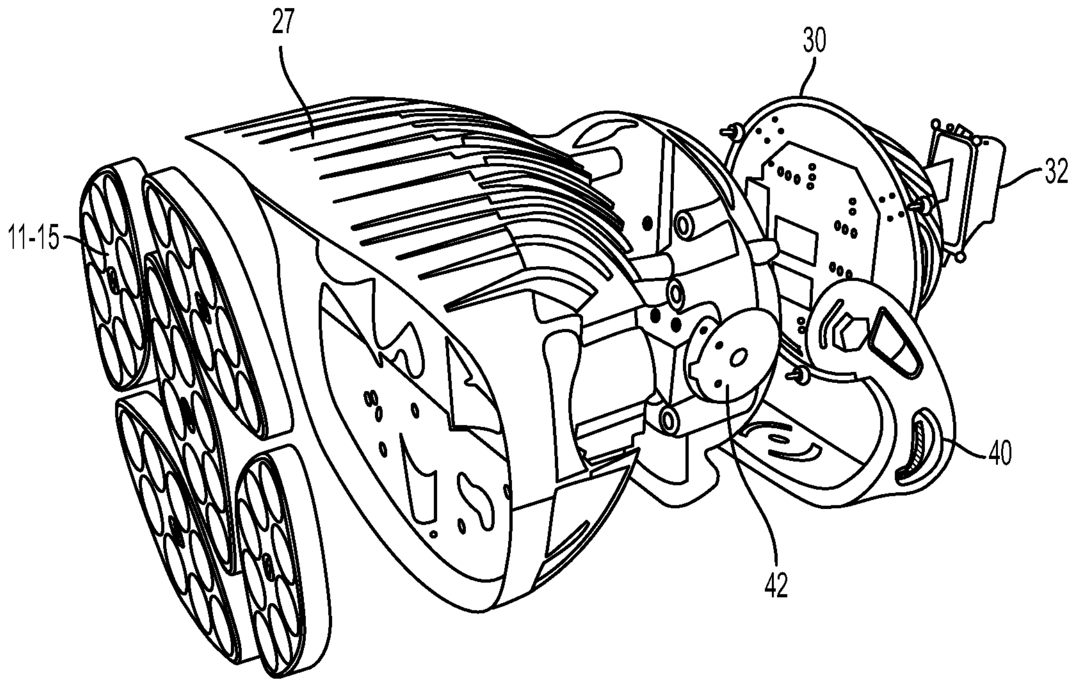
FIG. 4 is a cross-sectional view of various components of the device of FIG. 1.

FIG. 4 is a cross-sectional view of an embodiment of the lighting device, showing components including the front body portion 27 (which includes a heat sink and is integral with a shroud), the LED modules 11-15, the mounting bracket 40, power supply housing 30 and control circuitry housing 32. A thermal separation interface 42 separates the power supply housing 30 from the remainder of the heat sink body 27. The power supply housing 30 may be connected to one side of the interface 42, and the other side of the interface 42 may connect to the fins of the remainder of the heat sink body 27. The thermal separation interface 42 may be made of materials that help shield the LED modules from heat generated by the power supply. Such materials may include, for example, aluminum, plastic, ceramic, carbon fiber, composite materials or other materials.

Figure 5:
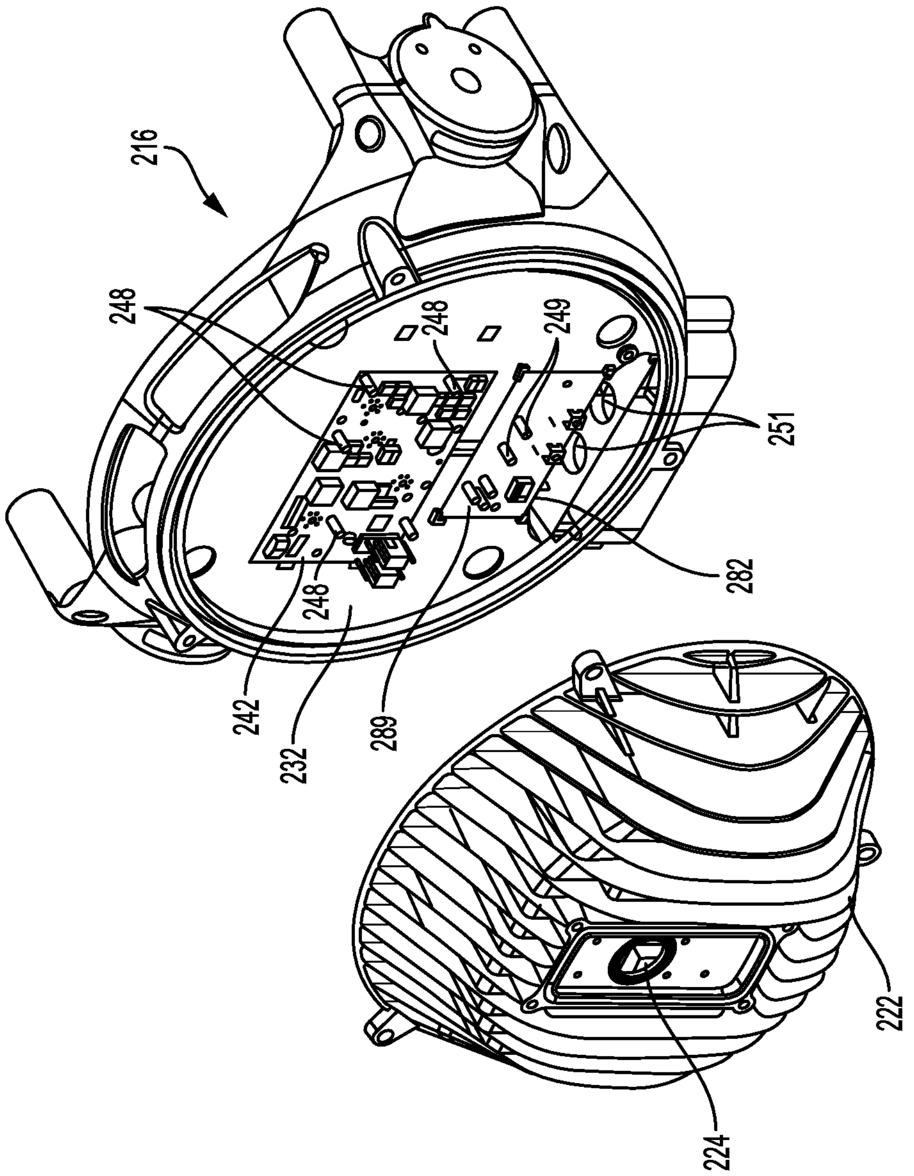
FIG. 5 is an expanded view showing how the various internal components of the device of FIG. 1, including a circuit and substrate with push pins.
Figure 6:
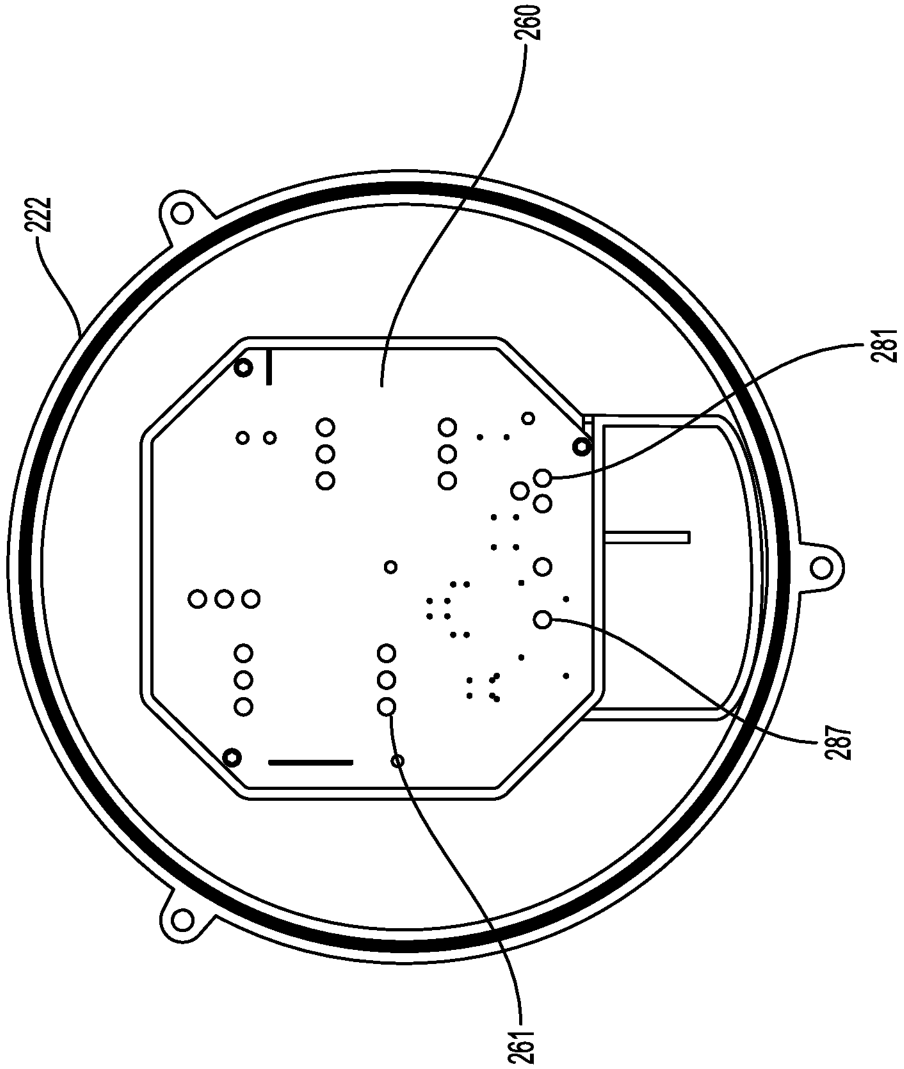
FIG. 6 shows an internal landing board of the device of FIG. 1, that receives the push pins.

FIGS. 5 and 6 illustrate how a set of contacts may be applied to an embodiment of the LED luminaire device of FIG. 1 to enable quick disassembly for changing out various components of the luminaire device.

As shown in FIG. 5, in an embodiment, a plurality of contacts 249 may be included in a contact housing 282, and may be in electrical communication with a control circuit board 242. In an embodiment, the contacts 249 may be spring contacts (discussed below with respect to FIG. 9). In an embodiment, the housing 282 may be positioned on a rear surface of an LED housing 216 that contains one or more LED modules that are electrically connected to the control circuit board 242 via one or more conductors such as wires or conductive traces. The LED housing 216 may also include an interface plate 232 as a rear surface for receiving the control circuit board 242 and the contact housing 282. The interface plate 232 may include one or more conductors such as wires or conductive traces for providing an electrical contact between the contacts 249 and the control circuit board 242. In FIG. 5, the LED housing 216 may be attached to the heatsink housing 222.

Figure 9:
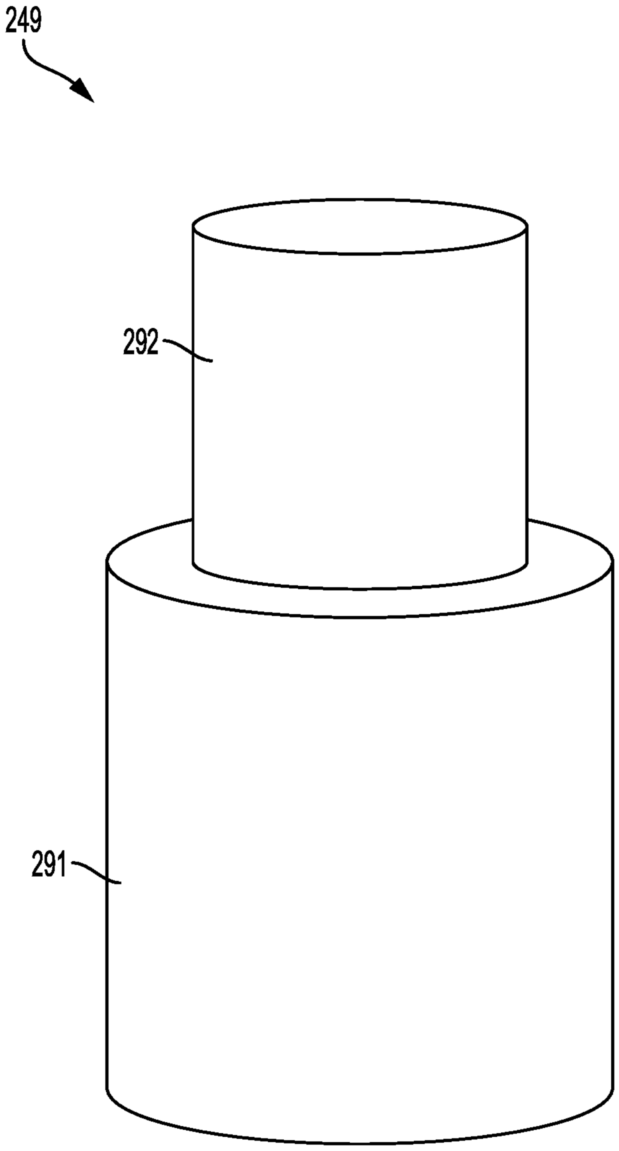
FIG. 9 illustrates an example of certain components of a spring contact.

FIG. 9 illustrates an example of a spring contact 249 which includes an outer housing 291 and a conductive contact 292. As shown, both portions of the contact are cylindrical, but other shapes may be used. The outer housing 291 may contain a spring or other resilient member that pushes the conductive contact 292 outward when in a relaxed position. When the conductive contact 292 is pressed against a contact pad (discussed below), the resilient member will compress and the conductive contact will move at least partially into the housing 291, providing a resilient connection and transmission of electrical signals. The conductive contact 292 has a diameter (or other largest lateral dimension) that is smaller than the inner diameter (or other smallest lateral dimension) of the housing 291 so that the housing 291 may receive the contact 292. The conductive contact 292 of the spring contact 249 will be electrically connected to one or more other components of the lighting device circuitry.

FIG. 6 illustrates the complementary contact pads included in the heatsink housing 222 that align (and/or couple) with the spring contacts 249 and/or data contact 248 to form a conductive path between the control circuit board 242 of the LED housing 216 and various components of the heatsink housing 222. In an embodiment, the complementary contact pads contacts are landing pads 261 positioned on a contact surface 260 within the heatsink housing 222. Each of the spring contacts 249 and/or data contacts 248 is positioned to make contact with a corresponding one of the landing pads 261 when the LED module 216 is assembled to the heatsink housing 222. When the LED housing 216 is aligned against the heatsink housing 222, each of the landing pads 261 is an electrically conductive contact that receives a corresponding spring contact 249. Each of the landing pads may have a larger surface area than its corresponding spring contact to increase assembly tolerances. For example, in the case of cylindrical pushpins having a slightly rounded upper surface, the landing pads 261 may have a larger diameter than the cross-sectional diameter of the cylindrical portion of the pushpin portion of the spring contact.

In an embodiment, due to the mechanical alignment between the heatsink housing 222 and the interface plate 232 on which the control circuit 242 is mounted, the chances of a poor connection due to human error during assembly of the interface 232 to the heatsink housing 222 is reduced. Furthermore, the spring contacts push against the contact surface to ensure a strong conductive path with the corresponding landing pads even if the distance between the spring contact and landing pad of different pairs of spring contacts and landing pads varies. The contact surface 260 may be adapted to be electrically coupleable to different configurations of contact housing 282 on different LED illumination devices, without compromising the electrical conductivity of the connection formed. Further, the contact surface 260 may be configured to have a shape such the contact surface can only be positioned in the heatsink housing in one position in order to avoid wiring errors during assembly or repair. In addition, assembly can be done quickly, since manual connection of a wiring harness is not required when assembling the unit.

In an embodiment, any number of spring contacts 249, landing pads 261 and LED modules may be used. For example, in the embodiment shown in FIG. 6, five sets of three landing pads 261 arranged in a row are provided. Each of these landing pads 261 corresponds to a positive terminal and a negative terminal for DC power, and a control terminal, and will connect to a corresponding set of three spring contacts for providing power and for transmitting and/or receiving control signals to and/or from a corresponding LED module.

In an embodiment, the landing pads 261 may be electrically connected to a power supply (not shown, but connected to the heatsink housing 222 at 224) and/or other control circuitry within the heatsink housing 222. For example, the landing pads 261 may include a positive terminal, a negative terminal and/or a control terminal. In an embodiment, the heatsink housing 222 may also include an AC-to-DC transformer that serves as a DC power supply for components of the LED modules in the LED housing 216, via the conducting path formed between the spring contacts 249 and the landing pads 261. Alternatively and/or additionally, the LED housing 216 may include its own AC-to-DC transformer, and the electrical connection may be used to transfer AC power from the power supply attached to the heatsink housing 222 to the LED housing 216.

Alternatively and/or additionally, if external power is wired to the device through the LED housing 216 (such as through ports 251), then the LED housing may include an input distribution card and a pair of spring contacts 289 (one that provides a positive terminal and one that provides a negative terminal) to transfer AC power to corresponding landing pads 287 of the heatsink housing 222 for supplying power to the heatsink components (if needed) and/or for conversion of AC to DC. Alternatively and/or additionally, the LED housing 216 may include its own AC-to-DC transformer and then the spring contacts that transfer AC and DC between the two housings 216 and 222 may not be required. In an embodiment, AC may be received directly into the heatsink housing 222 (as discussed above), and if so then the AC spring contacts 289 of the distribution card may not be required.

In an embodiment, the contact surface 260 may be mounted at the front of the power supply 224 such that the power supply 224 can be removed from the heatsink housing 222 together with contact surface 260 such that the landing pads 261 disconnect from the spring contacts 249. Thus, repair of the power supply 224 is easier due to the modular design, without disrupting manual connections. Furthermore, as discussed above, errors during reassembly may be avoided by configuring the contact surface 260 such that it can only be positioned in the heatsink housing in one position In an embodiment, the heatsink housing 222 may include components for receiving external control signals and/or other communication such as an antenna, transceiver, or the like. In an embodiment, the heatsink housing 222 may transmit the external control signals and/or other communication to the control circuit board 242, via a conductive path formed between the landing pads 261 and the spring contacts In an embodiment, one or more data contacts 248 may also be included in the control circuit board 242. Optionally, the data contacts 248 may also be spring contacts. In an embodiment, other landing pads (e.g., 281) may provide a conductive path to transmit communication and/or control signals, such as from a transceiver positioned within or attached to the heatsink housing 222 directly to a control card included in the control circuit board 242. The control signals may include signals to control certain output characteristics of the LEDs, such as controls to alter the brightness, color temperature, color, or other characeristics by selecting which LEDs to turn on and off, or to adjust individual LED operation through pulse width modulation.

Figure 7:
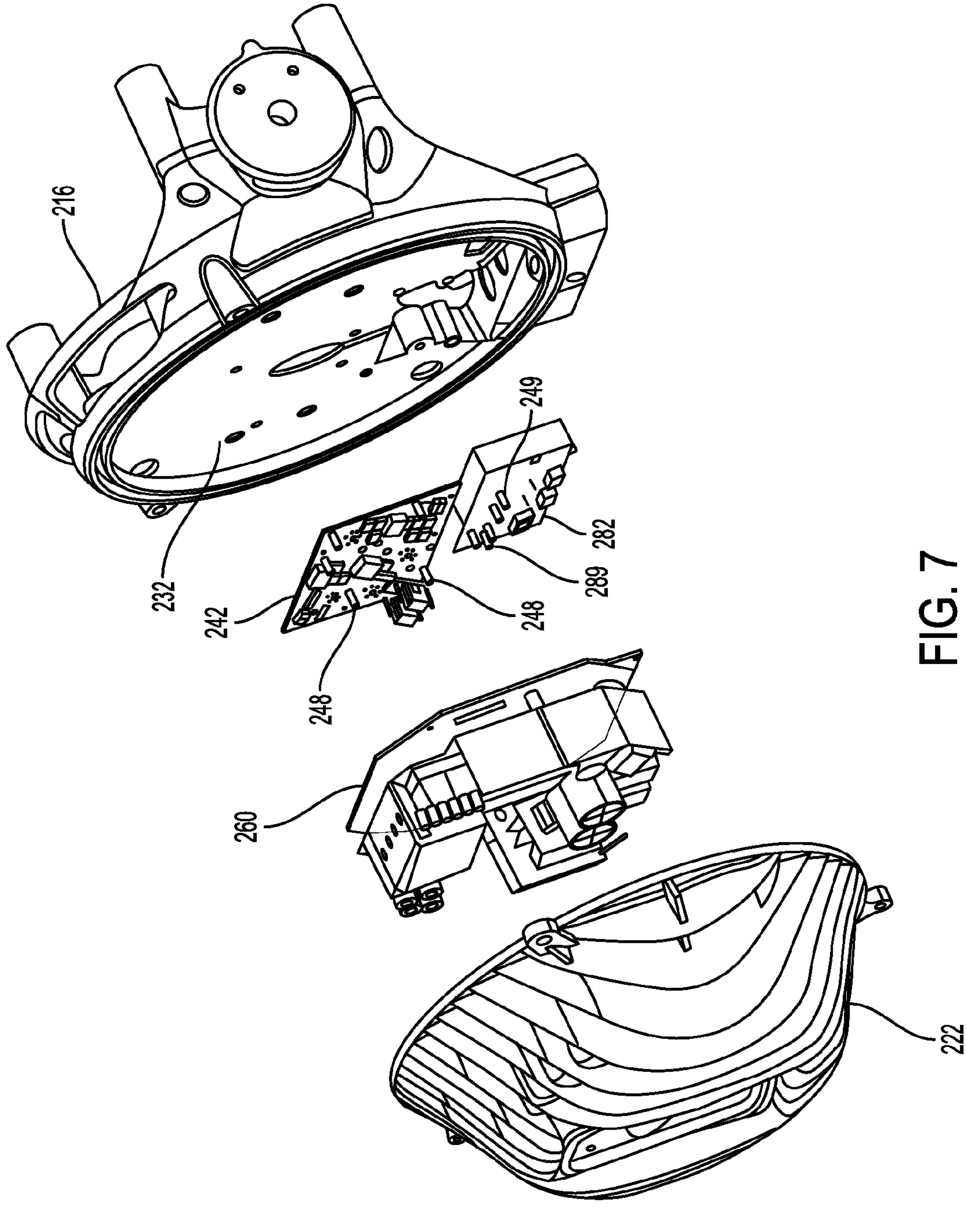
FIG. 7 is an expanded view showing various components that correspond to those of FIG. 5.
Figure 8:
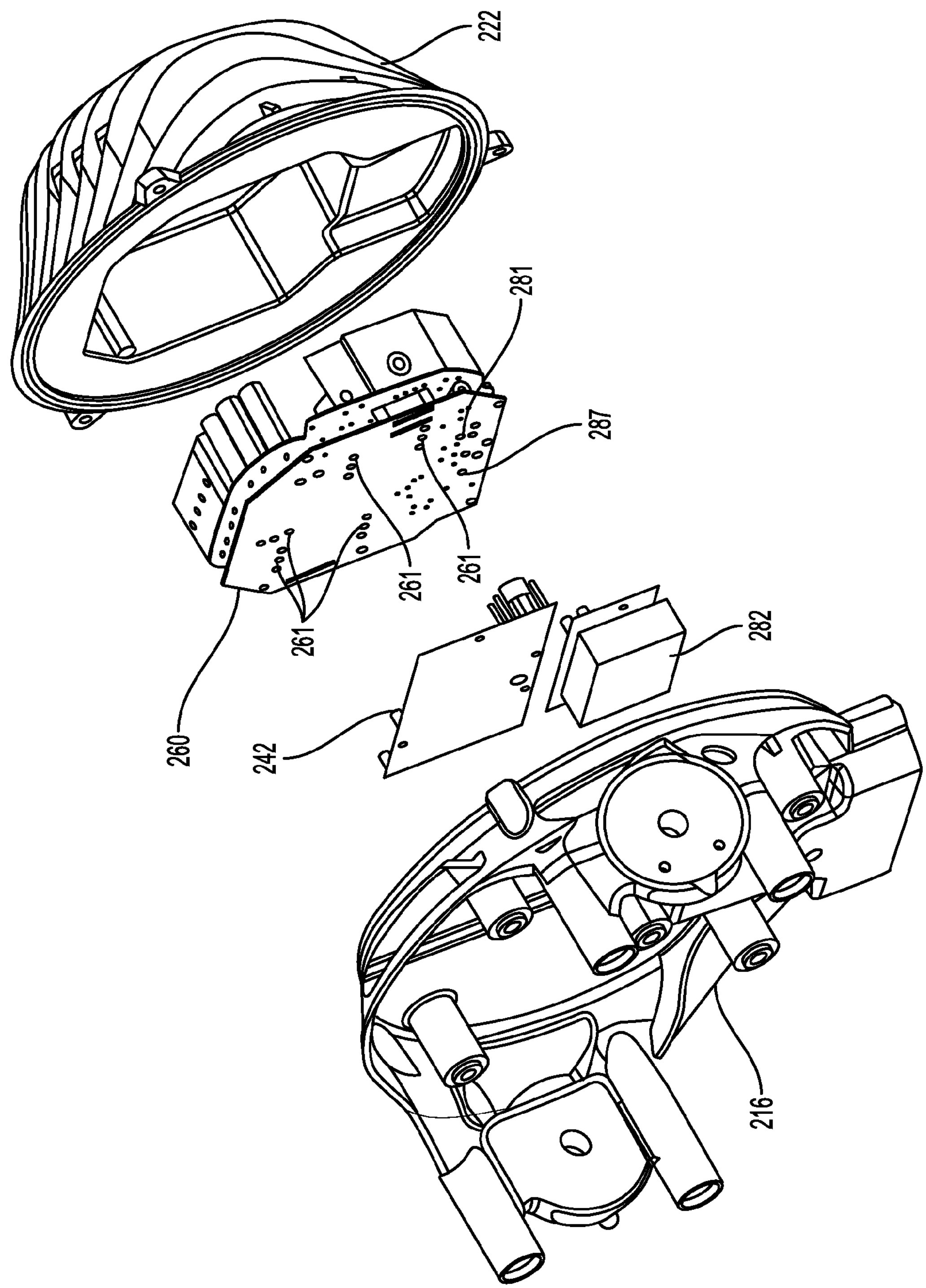
FIG. 8 is an expanded view showing various components that correspond to those of FIG. 6.

FIGS. 7 and 8 are expanded views that help to further illustrate the components of FIGS. 5 and 6, respectively. In these figures, spring contacts 249 and landing pads 261 may connect and pass control signals and/or DC power from the control circuitry housing to the LED modules. Spring contacts 289 and landing pads 287 may pass AC power from the LED housing to the power supply for transformation to DC. Each of the five sets of three landing pads 261 may provide DC power and a data signal to a corresponding set of spring contacts (e.g., a data contact plus two corresponding DC contacts) for an LED module. Although five LED modules and five sets of contact/landing pad pairs are shown, any number of LED modules may be used, each of which may include a dedicated spring contact/landing pad pair.

When the heatsink housing 222 is connected to the LED housing 216, the spring contacts (i.e., spring loaded or otherwise resilient, electrically conductive pins) instead of wiring blocks or connectors can significantly reduce assembly time by eliminating the need to connect wiring between the heatsink body and LED during assembly or the device.

While the examples shown illustrate the spring contacts being connected to the LED housing and the landing pads being connected to the heat sink body, the disclosed embodiments include variants in which these positions are exchanged. In other word, the spring contacts may be included in the heat sink body, and the landing pads may be included in the LED housing, in various embodiments.

It is intended that the portions of this disclosure describing LED modules, control systems and methods are not limited to the embodiment of the illumination devices disclosed in this document. The LED modules, control systems and control methods may be applied to other LED illumination structures, such as those disclosed in U.S. Patent Application Pub. No. 2014/0334149 (filed by Nolan et al. and published Nov. 13, 2014), and in U.S. Patent Application Pub. No., 2015/0167937 (filed by Casper et al. and published Jun. 18, 2015), the disclosures of which are fully incorporated herein by reference.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A light emitting diode (LED) luminaire device, comprising:

an LED housing comprising one or more LED modules, wherein each LED module comprises one or more LED arrays and a control circuit;

a body comprising:

a power supply, a transceiver, and a contact surface that is electrically connected to the power supply;

a plurality of contacts electrically connected to one of either the control circuit or the contact surface, wherein a first contact is electrically connected to the transceiver via the contact surface and a second contact electrically connected to the control circuit; and a plurality of landing pads electrically connected to the other of either the control circuit or the contact surface; wherein:

one or more of the contacts and one or more of the landing pads are positioned to align to each other and provide one or more conductive paths between the power supply and the control circuit when the LED housing is connected to the body, the first contact is either a spring contact or a landing pad, the second contact is the other of either a spring contact or a landing pad, and the first and second contacts are positioned to align to each other and provide a conductive path for communication signals between the transceiver and the control circuit when the LED housing is connected to the body.

2. The device of claim 1, wherein:

the LED housing further comprises an interface plate; and the control circuit is connected to the interface plate.

3. The device of claim 1, wherein the plurality of contacts comprise one or more spring contacts.

4. The device of claim 1, wherein the body comprises a plurality of fins that form a heat sink.

5. The device of claim 1, wherein the body further comprises a transformer configured to convert power received at the power supply before transmission to the control circuit, via the conductive path.

6. The device of claim 1, wherein the contact surface has a shape that allows for the attachment of the contact surface to the body in only one configuration.

7. The device of claim 1, wherein each of the plurality of landing pads has a surface area that is more than a surface area of corresponding ones of the plurality of spring contacts that form the one or more conductive paths.

8. The device of claim 1, wherein one or more of the contacts are included in a contact housing.

9. A light emitting diode (LED) luminaire device, comprising:

an LED housing comprising:

one or more LED modules, an interface plate, and a control circuit connected to the interface plate, wherein the control circuit is electrically connected to each of the LED modules;

a body comprising:

a communication circuit, a power supply, and a contact surface that is electrically connected to the communication circuit;

a plurality of contacts electrically connected to one of either the control circuit or the contact surface, wherein a first contact is electrically connected to the power supply via the contact surface and a second contact electrically connected to the control circuit; and a plurality of landing pads electrically connected to the other of either the control circuit or the contact surface; wherein:

one or more of the contacts and one or more of the landing pads are positioned to align to each other and provide one or more conductive paths between the communication circuit and the control circuit when the LED housing is connected to the body, the first contact is either a spring contact or a landing pad, the second contact is the other of either a spring contact or a landing pad, and the first and second contacts are positioned to align to each other and provide a first conductive path for transmission of power between the power supply and the control circuit when the LED housing is connected to the body.

10. The device of claim 9, wherein the plurality of contacts comprise one or more spring contacts.

11. The device of claim 9, wherein the body further comprises a transformer configured to convert power received at the power supply before transmission to the control circuit, via the first conductive path.

12. The device of claim 9, further comprising:

a second power supply configured to be attached to the LED housing;

a third contact electrically connected to the second power supply; and a second fourth contact electrically connected to the contact surface;

where the third contact is either a spring contact or a landing pad, the fourth contact is the other of either a spring contact or a landing pad, and the third and fourth contacts are positioned to align to each other and provide a second conductive path for transmission of AC power between the second power supply and the contact surface when the LED housing is connected to the body.

13. The device of claim 12 further comprising:

a fifth contact electrically connected to the control circuit;

a sixth contact electrically connected to the contact surface;

a transformer configured to convert AC power received, via the first conductive path, to DC power; and where the fifth contact is either a spring contact or a landing pad, the sixth contact is the other of either a spring contact or a landing pad, and the fifth and sixth contacts are positioned to align to each other and provide a third conductive path for transmission of DC power to the control circuit when the LED housing is connected to the body.

14. The device of claim 9, wherein the body comprises a plurality of fins that form a heat sink.

15. The device of claim 9, wherein the contact surface has a shape that allows for the attachment of the contact surface to the body in only one configuration.

16. The device of claim 9, wherein each of the plurality of landing pads have a surface area that is more than a surface area of corresponding ones of the plurality of spring contacts that form the one or more conductive paths.

17. The device of claim 9, wherein one or more of the contacts are included in a contact housing.

18. A light emitting diode (LED) luminaire device, comprising:

an LED housing comprising:

one or more LED modules, an interface plate, a power supply, and a control circuit connected to the interface plate, wherein the control circuit is electrically connected to each of the LED modules;

a body comprising:

a communication circuit, and a contact surface that is electrically connected to the communication circuit;

a plurality of contacts electrically connected to one of either the control circuit or the contact surface, wherein a first contact is electrically connected to the power supply and a second contact is electrically connected to the contact surface; and a plurality of landing pads electrically connected to the other of either the control circuit or the contact surface;

wherein:

one or more of the contacts and one or more of the landing pads are positioned to align to each other and provide one or more conductive paths between the communication circuit and the control circuit when the LED housing is connected to the body, the first contact is either a spring contact or a landing pad, the second contact is the other of either a spring contact or a landing pad, and the first and second contacts are positioned to align to each other and provide a first conductive path for transmission of AC power between the power supply and the contact surface when the LED housing is connected to the body.

19. The device of claim 18, wherein the plurality of contacts comprise one or more spring contacts.

20. The device of claim 18, wherein the body further comprises:

a second power supply; and a transformer configured to convert power received at the second power supply before transmission to the control circuit, via a second conductive path for transmission of power between the power supply and the control circuit when the LED housing is connected to the body.

21. The device of claim 18, further comprising:

a third contact electrically connected to the control circuit;

a fourth contact electrically connected to the contact surface;

a transformer configured to convert AC power received, via the first conductive path, to DC power; and where the third contact is either a spring contact or a landing pad, the fourth contact is the other of either a spring contact or a landing pad, and the third and fourth contacts are positioned to align to each other and provide a second conductive path for transmission of DC power to the control circuit when the LED housing is connected to the body.

22. The device of claim 18, wherein the body comprises a plurality of fins that form a heat sink.

23. The device of claim 18, wherein the contact surface has a shape that allows for the attachment of the contact surface to the body in only one configuration.

24. The device of claim 18, wherein each of the plurality of landing pads have a surface area that is more than a surface area of corresponding ones of the plurality of spring contacts that form the one or more conductive paths.

25. The device of claim 18, wherein one or more of the contacts are included in a contact housing.

* * * * *